UNITED STATES PATENT OFFICE.

FRITZ HOFMANN, CARL COUTELLE, AND LUDWIG TANK, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING ERYTHRENE.

1,050,077.     Specification of Letters Patent.     Patented Jan. 7, 1913.

No Drawing.     Application filed February 21, 1912. Serial No. 679,082.

*To all whom it may concern:*

Be it known that we, FRITZ HOFMANN, CARL COUTELLE, and LUDWIG TANK, doctors of philosophy, chemists, citizens of the German Empire, residing at Elberfeld, Germany, have invented new and useful Improvements in Processes of Producing Erythrene, of which the following is a specification.

It has been found that the technically very valuable hydrocarbon erythrene can be obtained in a very simple manner by decomposing cyclohexanes by the action of hot contact bodies, such as hot surfaces and by isolating the hydrocarbon from the gaseous mixture thus obtained. The process can be carried out with or without the addition of agents promoting the decomposition.

In order to illustrate the new process more fully the following example is given:—Clyclohexane is heated in a suitable apparatus in such a way that the vapors pass over a spiral of aluminium silicates, which is electrically heated to dark red heat. The unchanged parent material returns into the boiler while the gases are freed from liquid hydrocarbons by efficient cooling. In addition to other hydrocarbons the escaping gases contain very considerable quantities of erythrene. By physical or chemical methods the erythrene can be isolated from this mixture.

Instead of the cyclohexane described in the example homologues and derivatives of the cyclohexane, such as methylcyclohexanes, dimethylcyclohexanes or other alkyl- or arylcyclohexanes, alkoxycyclohexanes or halogencyclohexanes can be used as well as mixtures of these bodies. In the same way instead of the aluminium silicates other compounds capable of being heated, such as platinum, quartz, carbon, etc., can be used for effecting the decomposition. Furthermore the heating may be effected by other than the electrical means. The temperature can vary within rather wide limits.

We claim:—

1. The process of producing an erythrene hydrocarbon which comprises decomposing cyclohexanes by hot contact bodies.

2. The process of producing erythrene which comprises decomposing cyclohexanes by hot contact bodies.

3. The process of producing erythrene which comprises decomposing cyclohexanes by hot contact bodies, and in isolating erythrene from the resulting gaseous products of decomposition, substantially as described.

4. The process of producing erythrene which comprises decomposing cyclohexanes by hot contact bodies, continuously separating the gaseous products of decomposition from the undecomposed starting material, and isolating the erythrene from such gaseous products of decomposition, substantially as described.

5. The process of producing erythrene which comprises distilling cyclohexanes and passing the vapors of distillation over hot contact bodies, continuously separating the gaseous products of decomposition, and returning the unchanged starting material and liquid products of decomposition to the distilling apparatus, substantially as described.

6. The process of producing an erythrene hydrocarbon which comprises decomposing cyclohexanes by an electrically heated contact body.

7. The process of producing erythrene which comprises decomposing cyclohexanes by an electrically heated contact body.

8. The process of producing erythrene which comprises distilling cyclohexanes and passing the vapors of distillation over an electrically heated contact body, continuously separating the gaseous products of decomposition, and returning the unchanged starting material and liquid products of decomposition to the distilling apparatus, substantially as described.

9. The process of producing an erythrene hydrocarbon which comprises decomposing cyclohexanes by heated aluminium silicate as a contact body.

10. The process of producing erythrene which comprises decomposing cyclohexanes by heated aluminium silicate as a contact body.

11. The process of producing erythrene which comprises distilling cyclohexanes and passing the vapors of distillation over heated aluminium silicate as a contact body, continuously separating the gaseous products of decomposition, and returning the unchanged starting material and liquid products of decomposition to the distilling apparatus, substantially as described.

In testimony whereof we have hereunto set our hands in the presence of two subscribing witnesses.

FRITZ HOFMANN. [L. S.]
CARL COUTELLE. [L. S.]
LUDWIG TANK. [L. S.]

Witnesses:
HELEN NUFER,
ALBERT NUFER.